(12) United States Patent
Hanagata

(10) Patent No.: US 6,321,979 B1
(45) Date of Patent: Nov. 27, 2001

(54) MAGNETIC TAPE APPARATUS AND COMPUTER-READABLE MAGNETIC TAPE MEDIUM

(75) Inventor: Tadashi Hanagata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/296,124

(22) Filed: Apr. 22, 1999

(30) Foreign Application Priority Data

Apr. 24, 1998 (JP) .................................................. 10-114815

(51) Int. Cl.⁷ ...................................................... G06F 17/00
(52) U.S. Cl. .......................... 235/375; 235/449; 235/493; 369/58; 361/61
(58) Field of Search .................................... 235/375, 436, 235/437, 449, 454, 493; 712/220, 226; 369/58, 47, 59; 361/39, 61, 75; 705/28, 29

(56) References Cited

U.S. PATENT DOCUMENTS

| | | | |
|---|---|---|---|
| 5,075,805 | * | 12/1991 | Peddle et al. ........................... 360/61 |
| 5,428,755 | * | 6/1995 | Imai et al. ............................. 712/226 |
| 5,612,829 | * | 3/1997 | Takai et al. ............................. 360/54 |
| 5,914,928 | * | 6/1999 | Takahashi ............................... 369/58 |
| 5,959,280 | * | 9/1999 | Kamatani ............................... 235/454 |
| 6,026,468 | * | 2/2000 | Mase et al. ............................. 711/111 |

FOREIGN PATENT DOCUMENTS 5-265739   10/1993  (JP) .
8-76989    3/1996   (JP) .

* cited by examiner

*Primary Examiner*—Michael G. Lee
*Assistant Examiner*—Daniel St. Cyr
(74) *Attorney, Agent, or Firm*—Foley & Lardner

(57) ABSTRACT

The present invention provides a magnetic tape apparatus comprising: a tape drive for recording and reproducing data to/from a magnetic tape; a firmware memory containing firmware; and a controller for controlling the tape drive by executing the firmware, wherein the controller causes the magnetic tape apparatus to: read out a VOLID mark from an attribute information recorded between the BOT and a data on the magnetic tape; detect a volume identifier contained in the VOLID mark; decide that the data is firmware if the volume identifier contains a predetermined control code; and if the data is decided to be firmware, to overwrite the firmware recorded on the magnetic tape medium, upon the firmware memory.

5 Claims, 5 Drawing Sheets

| BIT POSITION | BITS 1 TO 48 | BITS 49 TO 56 | BITS 57 TO 64 | BIT 65 | BITS 66 TO 73 |
|---|---|---|---|---|---|
| CONTENT | VOLUME IDENTIFIER OF THE CARTRIDGE | VOLUME ACCESSIBILITY OF THE CARTRIDGE | LABEL STANDARD VERSION | MATCHED FLAG | CRC |
| VOL1 HEADER | SAME AS BYTES 5 TO 10 | SAME AS BYTE 11 | SAME AS BYTE 80 | — | — |
| VALUE | 6 ALPHANUMERIC CHARACTERS | SPACE | 「1」 | 1 | CALCULATION RESULT |
| EMBODIMENT | 1ST CHARACTER = 10h<br>2ND CHARACTER AND AFTER: MT001<br>(5 ALPHANUMERIC CHARACTERS OF MODEL NAME)<br>4D54303031h | SPACE, 20h | 「1」<br>31h | 1 | CALCULATION RESULT<br>B4h |
| EMBODIMENT 2 | 6 ALPHANUMERIC CHARACTERS | OTHER THAN SPACE | 「1」 | 1 | CALCULATION RESULT |
| EMBODIMENT 3 | 6 ALPHANUMERIC CHARACTERS | SPACE | OTHER THAN '1' | 1 | CALCULATION RESULT |

CRC Generator Polynomial
$G(X) = 1 + X + X^3 + X^4 + X^7 + X^8$

FIG.3

| BIT POSITION | BITS 1 TO 48 | BITS 49 TO 56 | BITS 57 TO 64 | BIT 65 | BITS 66 TO 73 |
|---|---|---|---|---|---|
| CONTENT | VOLUME IDENTIFIER OF THE CARTRIDGE | VOLUME ACCESSIBILITY OF THE CARTRIDGE | LABEL STANDARD VERSION | MATCHED FLAG | CRC |
| VOL1 HEADER VALUE | SAME AS BYTES 5 TO 10 | SAME AS BYTE 11 | SAME AS BYTE 80 | — | — |
| EMBODIMENT 1 | 6 ALPHANUMERIC CHARACTERS | SPACE |「1」 | 1 | CALCULATION RESULT |
| EMBODIMENT 2 | 1ST CHARACTER = 10h 2ND CHARACTER AND AFTER: MT001 (5 ALPHANUMERIC CHARACTERS OF MODEL NAME) 4D54303031h | SPACE, 20h | 「1」 31h | 1 | CALCULATION RESULT B4h |
| EMBODIMENT 3 | 6 ALPHANUMERIC CHARACTERS | OTHER THAN SPACE | 「1」 | 1 | CALCULATION RESULT |
| | 6 ALPHANUMERIC CHARACTERS | SPACE | OTHER THAN '1' | 1 | CALCULATION RESULT |

CRC Generator Polynomial
$G(X) = 1 + X + X^3 + X^4 + X^7 + X^8$

MAGNETIC TAPE APPARATUS AND COMPUTER-READABLE MAGNETIC TAPE MEDIUM

BACKGROUND OF THE INVENTION

1. Field of the Invention

The present invention relates to a magnetic tape apparatus and a magnetic tape medium which can be read by a computer.

2. Description of the Prior Art

The magnetic tape apparatus records or reproduces a data to/from a magnetic tape medium according to a firmware read from a firmware memory. This firmware maybe reversed but in general, the firmware update has been performed by replacement of a ROM of the magnetic tape apparatus.

Moreover, as a method for updating the firmware in more simple way, there has also been method to record a firmware in a magnetic tape medium and this magnetic tape medium is mounted on a magnetic tape apparatus, so that the firmware recorded on the magnetic tape medium is stored in the firmware memory for updating the firmware. Furthermore, Japanese Patent Publication (unexamined) 5-265739 and Japanese Patent Publication (unexamined) 8-76989 disclose a method for further simplified firmware updating. According to the disclosures of these publications, an identifier is recorded in a magnetic tape medium header for indicating that firmware is recorded in a magnetic tape medium header, and the magnetic tape apparatus, upon detection of this identifier, automatically updates the firmware.

However, the recording format of the magnetic tape medium is already specified by the ISO/IEC. When adding a new identifier to the firmware, there should be a discussion how the identifier is to be handled.

SUMMARY OF THE INVENTION

It is therefore an object of the present invention to provide a magnetic tape apparatus and a computer-readable magnetic tape medium capable of introducing firmware identifier enabling automatic firmware updating without modifying the format specified by the ISO/IEC14251 as a ½-inch width and 36-track information magnetic tape cartridge.

Accordingly, the present invention is a magnetic tape apparatus comprising: a tape drive for recording and reproducing data to/from a magnetic tape; a firmware memory containing firmware; and a controller for controlling the tape drive by executing the firmware. The controller causes the magnetic tape apparatus to: read out a VOLID mark from an attribute information recorded between the BOT and a data on the magnetic tape; detect a volume identification name contained in the VOLID mark; decide that the data is firmware if the volume identification name contains a predetermined control code; and if the data is decided to be firmware, to overwrite the firmware recorded on the magnetic tape medium, upon the firmware memory.

According to the present invention, by recording a predetermined code not used normally, for the volume identifier of the VOLID mark, it is indicated that the recorded data is firmware. This code is detected by a magnetic tape apparatus for automatically updating firmware. Thus, it is possible to automatically update firmware without modifying the existing magnetic tape format based on the ISO/IEC 14251 (JIS X 6135). The predetermined code is used as a code other than alphanumeric.

BRIEF DESCRIPTION OF THE DRAWINGS

FIG. 3 shows a detailed configuration of the VOLID mark of the magnetic tape medium according to the embodiment of the present invention.

DESCRIPTION OF THE PREFERRED EMBODIMENTS

Hereinafter, description will be directed to preferred embodiments of the present invention with reference to the attached drawings.

Figure 1:
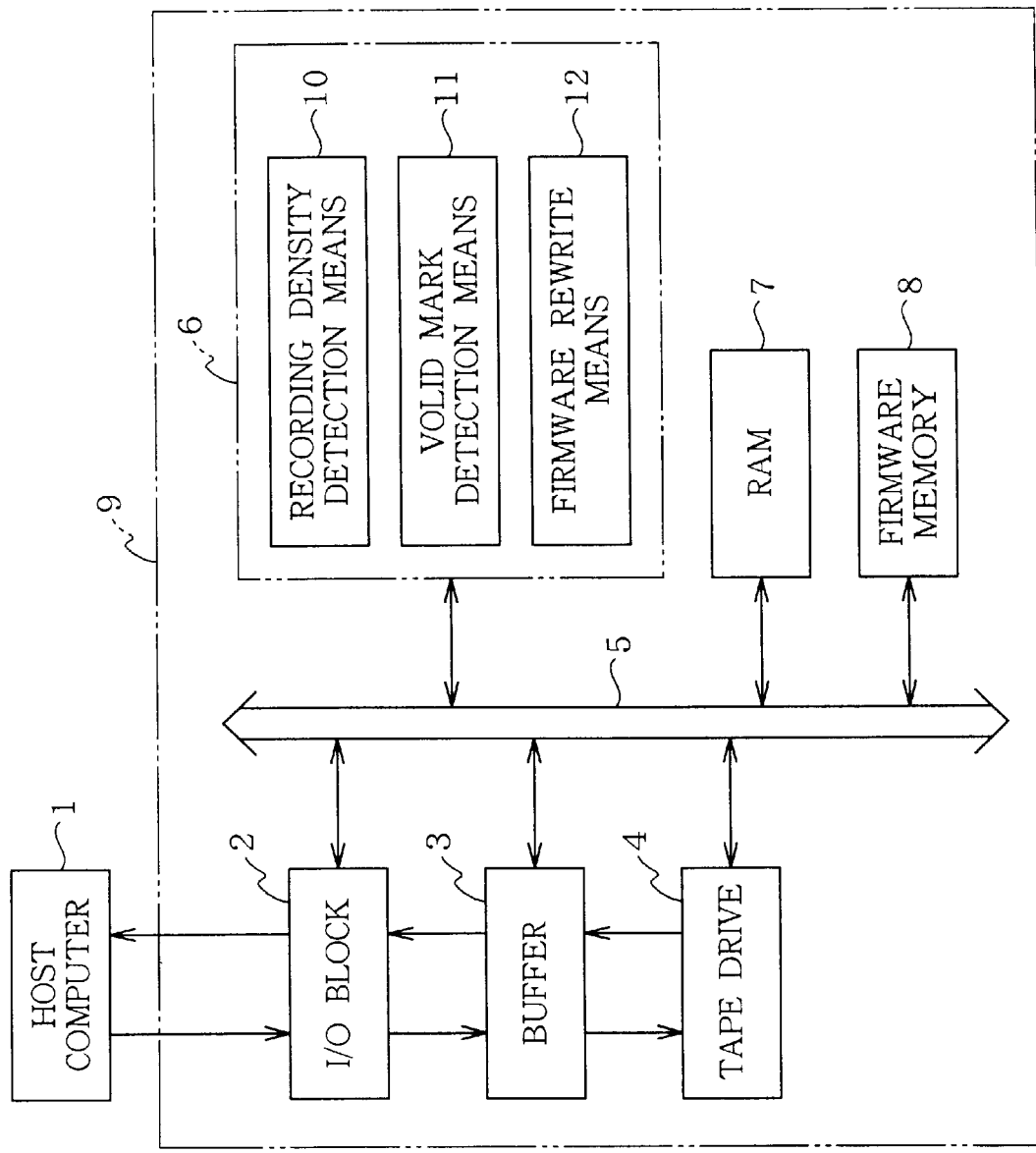
FIG. 1 is a block diagram of a magnetic tape apparatus according to an embodiment of the present invention.

FIG. 1 is a block diagram showing configuration of a magnetic tape apparatus according to an embodiment of the present invention. Referring to FIG. 1, the magnetic tape apparatus 9 is connected to a host computer 1 as a higher-node apparatus. The magnetic tape apparatus 9 includes: a buffer 3 for temporarily accumulating a data from the host computer 1 or a tape drive 4; an I/O block 2 for transmitting and receiving a data between the host computer 1 and the buffer 3; a tape drive 4 for recording/reproducing a data onto/from a magnetic tape medium; a controller 6 having built-in computer operable by program processing; a control signal line 5 for transmitting and receiving a control signal and a data between the controller 6 and the other components; a RAM 7; and firmware memory 8 for storing firmware for operating the controller 6.

The buffer 3 temporarily accumulates a data for absorbing a transfer rate difference between the host computer 1 and the tape drive 4. That is, a data coming via the I/O block from the host computer 1 is temporarily stored, so that an accumulated data is transferred to the tape drive 4 at once, and a data read out from the tape drive 4 at once is accumulated so that the data is transferred, when required, via the I/O block 2 to the host computer 1.

The controller 6 has a built-in computer operable by a program. The controller 6 executes firmware (program) stored in the firmware memory 8 connected via the control signal line 5. Here, the controller 6 may operate by reading the firmware directly from the firmware memory 8 or by copying the firmware in the RAM 7 and reading the firmware therefrom.

The firmware memory 8 stores a firmware for operating the controller 6, and employs an electrically rewritable nonvolatile memory (such as EEPROM and flash memory) so that rewriting can be performed during an operation of the magnetic tape apparatus. The controller 6 includes: recording density detection means 10; VOLID mark detection means 11; and firmware rewrite means 12. The recording density detection means 10, upon detection of a signal indicating that a magnetic tape medium is set on the tape drive 4, causes the magnetic tape medium to run up to a point immediately before a data and checks a recording density of the data.

The VOLID mark detection means 11, upon detection o a mark called VOLID mark by the recording density detection means 10, reads out the VOLID mark and recognizes an information written there. Here, it is decided whether the medium is a magnetic tape medium containing firmware, according to the information written in the VOLID mark.

The firmware rewrite means 12 is when the magnetic tape medium mounted on the tape drive 4 is identified as a magnetic tape medium containing firmware. The firmware rewrite means 12 reads out a data of the firmware from the tape drive 4 and overwrites the data on the firmware memory 8.

Figure 2:
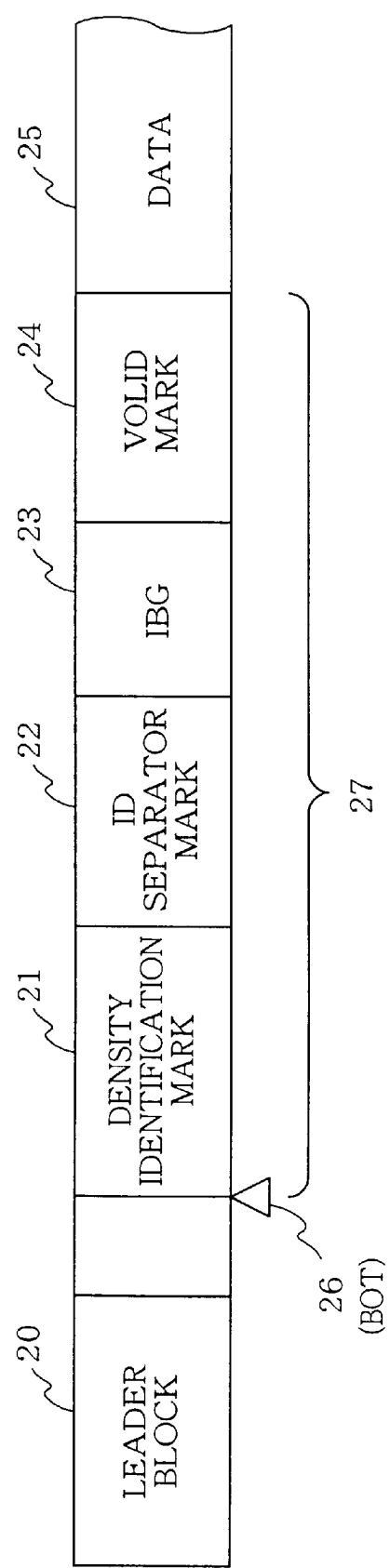
FIG. 2 schematically shows a format of a magnetic tape medium containing a VOLID mark according to the embodiment of the present invention.

Next, explanation will be given on the format of the medium containing firmware, with reference to FIG. 2 and FIG. 3. FIG. 2 shows the VOLID-mark-containing format of the ½-inch 36-track information magnetic tape cartridge specified by the ISO/IEC 14251 (JIS X 6135).

The leader block 20 pulls out a magnetic tape medium from the cartridge and sets the magnetic tape medium on the tape drive 4. A Beginning to Tape Marker (BOT) 26 indicates a starting point of the magnetic tape medium. Starting at this BOT 26, the format contains a density identification mark (density ID mark) 21 indicating a recording density; an ID separator mark 22 for isolating this density ID mark 21 from the other area; an IBG (interblock gap) 23 recorded between blocks; a VOLID mark 24; and a data 25 in this order. The VOLID mark 24 is an optional mark specified by the ISO/IEC 14251 (JIS X 6135). This mark will be detailed below with reference to FIG. 3. The VOLID mark is a volume identification data of a 73-bit cartridge expressed by a combination of VOLID "0" and VOLID "1".

The first 48 bits represent the volume identifier of the cartridge. If the starting portion of the data 25 contains a VOL1 header according to the ISO/IEC1001 (JIS X 0601), the volume identifier is identical to the contents of bytes 5 to 10 of the VOL1 header, and is normally expressed by six alphanumerics.

Subsequent eight bits from bit 49 to bit 56 represent the volume accessibility of the cartridge, which is identical to byte 11 of the VOL1 header if one is written, and is normally a space. Subsequent eight bits from bit 57 to bit 64 represent a label specification, which is identical to byte 80 of the VOL1 header if one is written. Normally, "1" is written.

Subsequent one bit, i.e., bit 65 is a flag indicating whether the preceding 64 bits satisfy the ISO/IEC 646 (JIS X 0201) specification. If the specification is satisfied, "1" is written. Subsequent eight bits, i.e., bit 66 to bit 73 are Cyclic Redundancy Checking (CRC) for checking the preceding 65-bit data. This CRC is generated from a generator polynomial shown in FIG. 3.

In a case of medium containing firmware, a particular character string consisting of characters not used normally is recorded in the VOLID mark 24 indicating that the magnetic tape contains a firmware. The magnetic tape apparatus uses the ASCII code or EBCDIC code as the character code. In either case, 00h to 1Ah are used as a code other than alphanumeric.

In the present embodiment, it is assumed that a ½-inch, 36-track magnetic tape apparatus named "MT001" uses the ASCII code. "10" is loaded in the first character of the volume identifier. In the second character and after, any model name can be specified. In this embodiment, "MT001" (4D54303031h) is used. After this, a data is loaded according to the specification. In this case, the CRC is B4h. By applying "10h" which is not a character code, for the first character of the volume identifier, it can be indicated that the magnetic tape is a medium containing a firmware.

Next, explanation will be given on the operation of the present embodiment with reference to FIG. 1 to FIG. 4

The controller 6 monitors a status change of the respective blocks. When a magnetic tape medium is inserted into the tape drive 4, the tape drive 4 pulls out a tape using the leader block 20 so that the tape can be read. When a signal indicating that a tape has been set is transmitted from the tape drive 4 to the controller 6, the controller 6 passes control to the recording density detection means 10.

Figure 4:
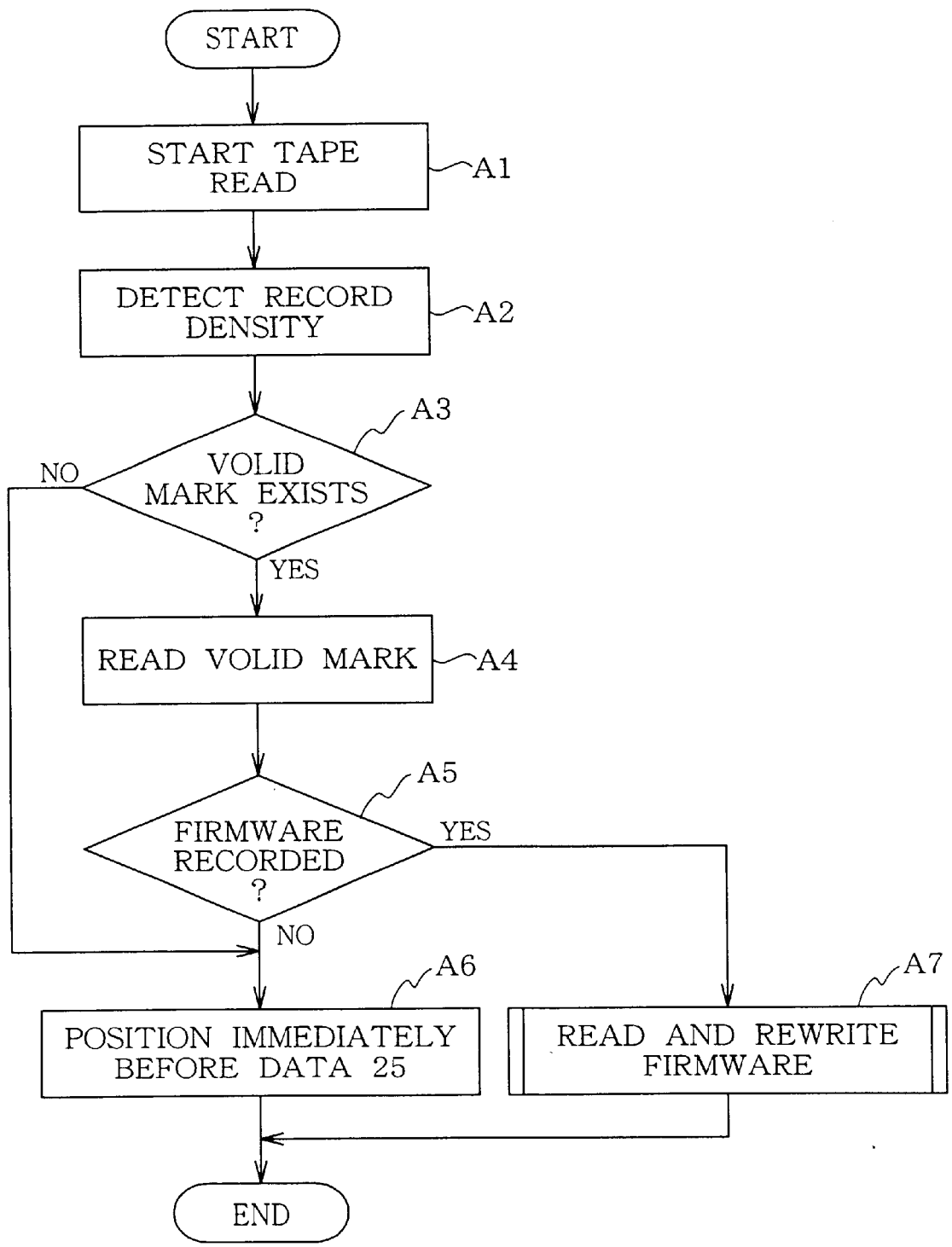
FIG. 4 is a flowchart showing an example flow of the operation of the embodiment.

The recording density detection means 10, firstly, starts reading of the magnetic tape medium (step A1 in FIG. 4). Next, the recording density of the tape is detected (step A2) by successively reading the density ID mark 21 for detecting the recording density; the ID separator mark 22 indicating a boundary between the density ID mark and the other portion; and IBG 23 recorded between blocks. Next, the subsequent one block is read in and it is decided whether the block is a VOLID mark 24 or a normal data 25 (step A3). If the block is not the VOLID mark 24, the tape is fed backward by one block because the block which has been read is the first block of the data 25, so as to position the data immediately before the data 25, thus completing the processing (step A6).

On the other hand, if the block is the VOLID mark, control is passed to the VOLID mark detection means 11.

The VOLID mark detection means 11, firstly, reads in the remaining 72-bit VOLID mark (step A4) . After reading the VOLID mark, it is confirmed whether the VOLID mark is correct. In the present embodiment, the CRC of bit 1 to bit 65 is recorded in bits 66 to 73. Accordingly, the CRC of 73 bits from bit 1 to bit 73 is calculated according to the generator polynomial of FIG. 3 and it is checked whether the result is 0. Next, it is confirmed the flag of bit 65 is 1, the label specification numbers of bits 57 to 64 are 1, and the volume accessibility of bits 49 to 56 is a space character.

It the aforementioned checks are decided to be correct, the label identification name is checked. If the first character of the label serial number is "10h", and the second character and after are matched with the model name "MT001", it is decided that the medium contains a firmware. If it is decided that the medium contains a firmware, control is passed to the firmware read-in and rewrite processing by the firmware rewrite means 12 (steps A5, A7). Otherwise, the processing is completed immediately before the data 25 (step A6).

Figure 5:
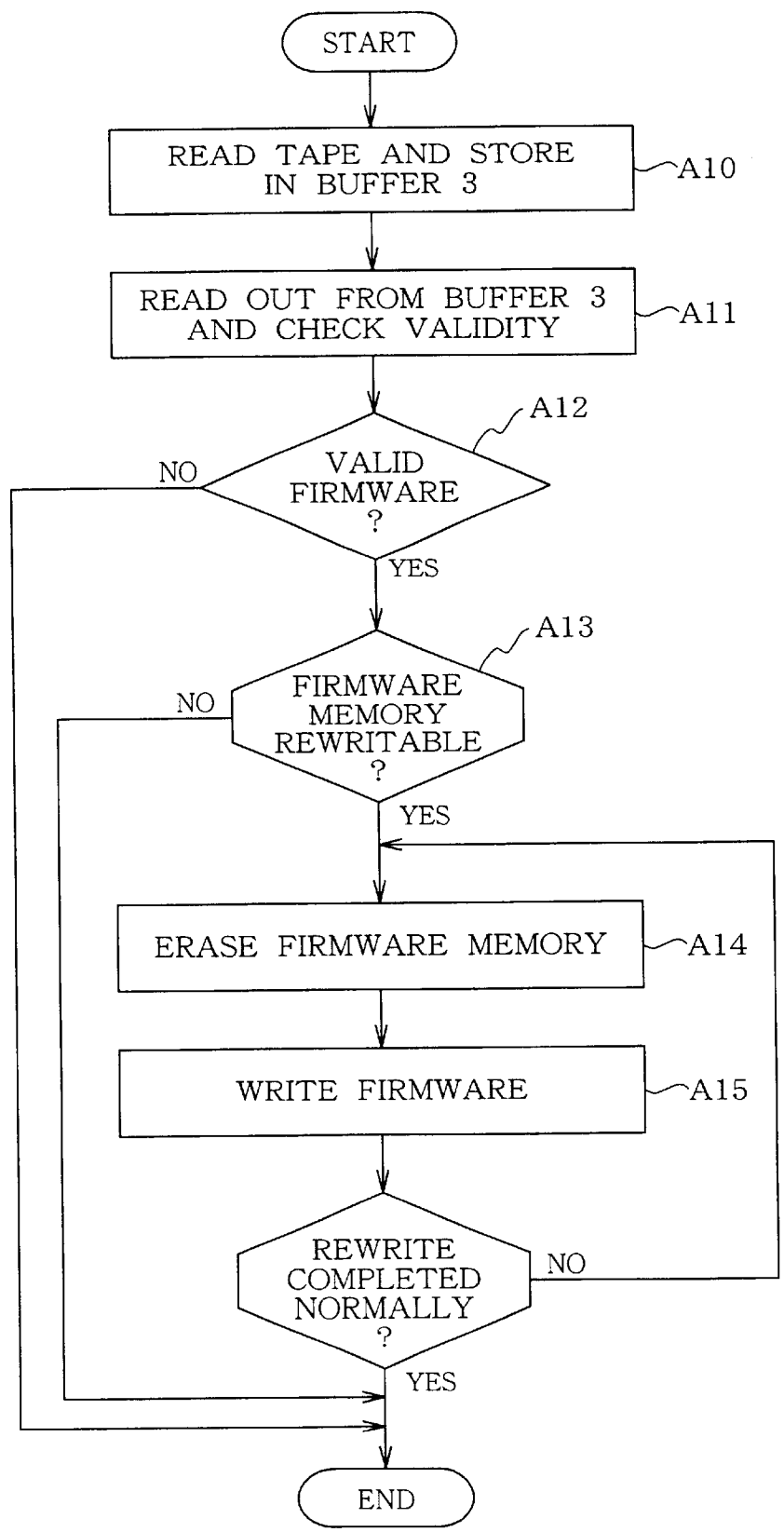
FIG. 5 is a flowchart showing firmware read and rewrite operation.

FIG. 5 is a flowchart showing an outline of the firmware read-in and rewriting processing in step A7 of FIG. 4. The firmware rewrite means 12 reads a firmware data from the tape and stores the data in the buffer 3. If the buffer 3 cannot store all of the data, the controller 6 reads out the data from the buffer 3 and stores the data in the RAM 7 (step 10).

When the firmware data reading from the tape is complete, the data is read out from the buffer 3 and the RAM 7, and check is made whether the data which has been read out has a correct length, whether embedded ID information is matched; and whether the check sum is matched with a calculated value, so as to confirm the validity of the firmware data (step A11).

If the check result is correct, control is passed to the next processing. Otherwise, the processing is terminated (step A12) Next, it is checked whether firmware memory 8 is rewritable. If the firmware memory 8 is rewritable, control is passed to the next processing. Otherwise, the processing is terminated (step A13) Next, the firmware memory 8 is erased. Even if a main firmware is read out directly from the firmware memory 8 and operating, firmware for erase and rewrite is copied to the RAM 7, and the firmware is read out from the RAM 7 for operation (step A14). If the erase is completed normally, the firmware is written into the firmware memory (step A15) . Then, it is verified whether the last firmware written is correct. If the firmware has not been written, control is returned to step A14 to repeat erase of the firmware memory 8 and after proceed thereafter. The aforementioned operation is automatically performed by the magnetic tape apparatus when a tape is set on the tape drive without requiring operation by the host computer or an operator. Thus, only by mounting on the drive a medium containing firmware, it is possible to update the firmware. This can be performed even by an operator having no experience. That is, it is possible to reduce expense required for updating the firmware. The reason is because the firmware is stored in a nonvolatile memory and an identifier indicating that firmware is recorded in an area which is automatically read in when the tape is mounted. As the firmware identifier, a control code normally not used for the VOLID mark is recorded. Thus, it is possible to automatically update firmware without modifying the existing magnetic tape format according to the ISO/IEC 14251 (JIS X 6135).

Next, explanation will be given on a second embodiment of the present invention.

Instead of using a code of other than normal alphanumeric for the volume identifier in VOLID as in the first embodiment, the volume accessibility is other than a space code, and the label specification number is other than "1".

This second embodiment can be realized only by modifying step A5 in FIG. 4, i.e., the condition for deciding whether the medium contains firmware. Thus, even by using a code consisting of other than normal alphanumeric, it is possible to prevent incorrect identification of a firmware recording medium.

Next, explanation will be given on a third embodiment. Instead of using the VOLID, an identifier is embedded in a part of the density ID mark. This is performed by utilizing the fact that the density ID mark is not used entirely and that the density ID mark is in an area which is read in when the medium is mounted. The density ID mark is recorded at the beginning of medium, starting at BOT and having a length of about 2 m. A 6-bit data "100000" is repeatedly recorded on a particular track of the 18 tracks, and all "1" data is recorded on the other tracks. Here, in the area of 25 mm from the BOT, a mark other than the density ID mark may be present.

However, the magnetic tape apparatus does not read the entire length of the 2 m for detecting density of the density ID mark. Moreover, the length required for recording information is very small compared to the length of the density ID mark. (A 1500 byte data written has only 1 mm or so.)

A predetermined code is recorded in a part of this density ID mark so that the magnetic tape medium can be recognized as a magnetic tape medium containing firmware.

It should be noted that, this mark is recognized as a defect or noise in the other apparatus, causing no problem. Moreover, it is also possible to embed a data in the same format at the normal data block in the 25 mm area starting at BOT, so that the tape medium can be recognized as one containing firmware. This also satisfy the standard specification.

Next, explanation will be given on a fourth embodiment of the present invention. In the firmware memory 8, a portion containing firmware used for rewriting firmware has a low probability to be rewritten, and that portion is not rewritten. In this embodiment, the area to be rewritten is reduced, which in turn increase the processing speed. Moreover, for a portion not to be rewritten, it is possible to use a read only memory (ROM). In this case, there is an effect to eliminate rewriting due to incorrect operation. Next, explanation will be given on a fifth embodiment of the present invention. In this embodiment, a configuration button is provided, so that the operator can confirm whether to rewrite firmware. In this case, step A13 of FIG. 5, i.e., decision whether rewrite is enabled, includes check whether the configuration button has been operated.

Moreover, it is possible to employ a combination of the second to fifth embodiments.

Moreover, in the first to the fifth embodiments, the present invention has been described as a magnetic tape apparatus. However, the present invention can also be preferably applied to a floppy disc apparatus, optical disc apparatus, disc array apparatus, and other apparatus capable of replacing a recording medium. In these cases, an identifier indicating that the medium contains firmware is embedded in a control area which is first to be read in each of the respective apparatuses.

According to the present invention which functions as has been described above, by recording a code not used normally, for the volume identifier of the VOLID mark, it is indicated that the recorded data is firmware. This code is detected by a magnetic tape apparatus for automatically updating firmware. Thus, it is possible to automatically update firmware without modifying the existing magnetic tape format based on the ISO/IEC 14251 (JIS X 6135). Moreover, the present invention can be embodied only by slightly modifying the firmware of the magnetic tape apparatus The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-114815 (Filed on Apr. 24, 1998) including specification, claims, drawings and summary are incorporated herein by reference in its entirety.

What is claimed is:

1. A magnetic tape apparatus comprising:
   a tape drive for recording and reproducing data to/from a magnetic tape;
   a firmware memory containing firmware; and
   a controller for controlling the tape drive by executing the firmware,
   wherein the controller causes the magnetic tape apparatus to:
      read out a volume identifier (VOLID) mark from an attribute information recorded between a beginning of tape marker (BOT) and a data on the magnetic tape;
      detect a volume identifier contained in the VOLID mark;
      determine that the data is firmware if the volume identifier contains a predetermined control code; and
      if the data is determined to be firmware, to overwrite the firmware recorded on the magnetic tape medium, upon the firmware memory,
   wherein the predetermined control code is a code that is not an alphanumeric character in either an ASCII or an EBCDIC character set.

2. A magnetic tape apparatus as claimed in claim 1, wherein the predetermined control code has a value in the range from 00h to 1Ah.

3. A magnetic tape apparatus as claimed in claim 1, wherein the controller determines that the data is firmware if a first character of the volume identifier is a predetermined code from 00h to 1Ah and if a second character and after contain a code identifying a model of the magnetic tape apparatus.

4. A magnetic tape apparatus comprising:
- a tape drive for recording and reproducing data to/from a magnetic tape;
- a firmware memory containing firmware; and
- a controller for controlling the tape drive by executing the firmware,
- wherein the controller includes:
    - volume identifier (VOLID) mark detection means for detecting a volume identifier contained in the VOLID mark and when the volume identifier has a portion containing a predetermined control code, to determine that the data is firmware, wherein the predetermined control code is a code that is not an alphanumeric character in either an ASCII or an EBCDIC character set; and
    - firmware rewrite means used when the data is determined to be firmware, for updating the firmware recorded on the magnetic tape medium, upon the firmware memory.

5. A magnetic tape apparatus as claimed in claim 4, wherein the volume identifier (VOLID) mark detection means includes means for determining that the data is firmware if a first character of the volume identifier is a predetermined code from 00h to 1Ah and if a second character and after contain a code identifying a model of the magnetic tape apparatus.

* * * * *